United States Patent [19]
Finley et al.

[11] Patent Number: 5,714,043
[45] Date of Patent: Feb. 3, 1998

[54] LIQUID SEAL BULK FEEDER FOR DESTRUCTIVE DISTILLATION

[75] Inventors: Dana J. Finley; Jeffrey D. Wilder, both of Albuquerque, N. Mex.

[73] Assignee: Tire Recycling Technologies Corp., Albuquerque, N. Mex.

[21] Appl. No.: 527,945

[22] Filed: Sep. 14, 1995

[51] Int. Cl.[6] ............................................. B01J 8/08
[52] U.S. Cl. ..................... 202/262; 198/545; 198/550.1; 198/657; 202/251; 202/253; 202/254; 202/269; 406/53; 422/150; 422/232
[58] Field of Search ........................... 198/545, 546, 198/530.1, 657; 202/251, 252, 253, 254, 260, 261, 262, 269; 406/53; 422/150, 232

[56] References Cited

U.S. PATENT DOCUMENTS

| | | | |
|---|---|---|---|
| 1,447,297 | 3/1923 | Day | 202/252 |
| 1,595,239 | 8/1926 | Minton . | |
| 2,029,985 | 2/1936 | Clark et al. . | |
| 3,385,695 | 5/1968 | Howie | 202/262 |
| 3,504,177 | 3/1970 | Walker et al. | 250/49.5 |
| 3,729,105 | 4/1973 | Huebler et al. | 414/152 |
| 4,247,240 | 1/1981 | Schora, Jr. et al. | 422/232 |
| 4,287,157 | 9/1981 | Koch | 422/205 |
| 4,326,556 | 4/1982 | Deutsch et al. | 137/240 |
| 4,579,562 | 4/1986 | Tarman et al. | 422/232 |

*Primary Examiner*—Timothy McMahon
*Attorney, Agent, or Firm*—John R. Lansdowne

[57] ABSTRACT

A combination liquid seal and spiral auger conveyor feeding system which provides both a liquid seal, effective under normal operating conditions, with a sealed spiral auger conveyor, which is effective to seal against the surge flow of distillation gases back through the feeding system. This is attained while providing for a reliable, continuous flow of solid bulk material such as rubber tire chips to a reactor or distillation unit. A bulk feeding system having a partially submerged inclined spiral auger conveyor is provided, communicating at its base with a liquid reservoir so as to form a liquid seal within the combined apparatus. Solid bulk material is introduced to the upper end of the liquid reservoir above the liquid level where it descends by the action of gravity into the liquid and sinks to the bottom of the reservoir to by picked up by the partially submerged rotating auger conveyor and elevated thereby. The bulk material is raised above the liquid level and introduced to the reactor or distillation unit inlet. The requirement of a small clearance between the flights of the auger and its cylindrical wall, along with the presence of the bulk material being conveyed within the auger, acts as a seal against distillation gas surges, thus avoiding fires and explosions in the bulk material storage and conveying apparatus.

13 Claims, 2 Drawing Sheets

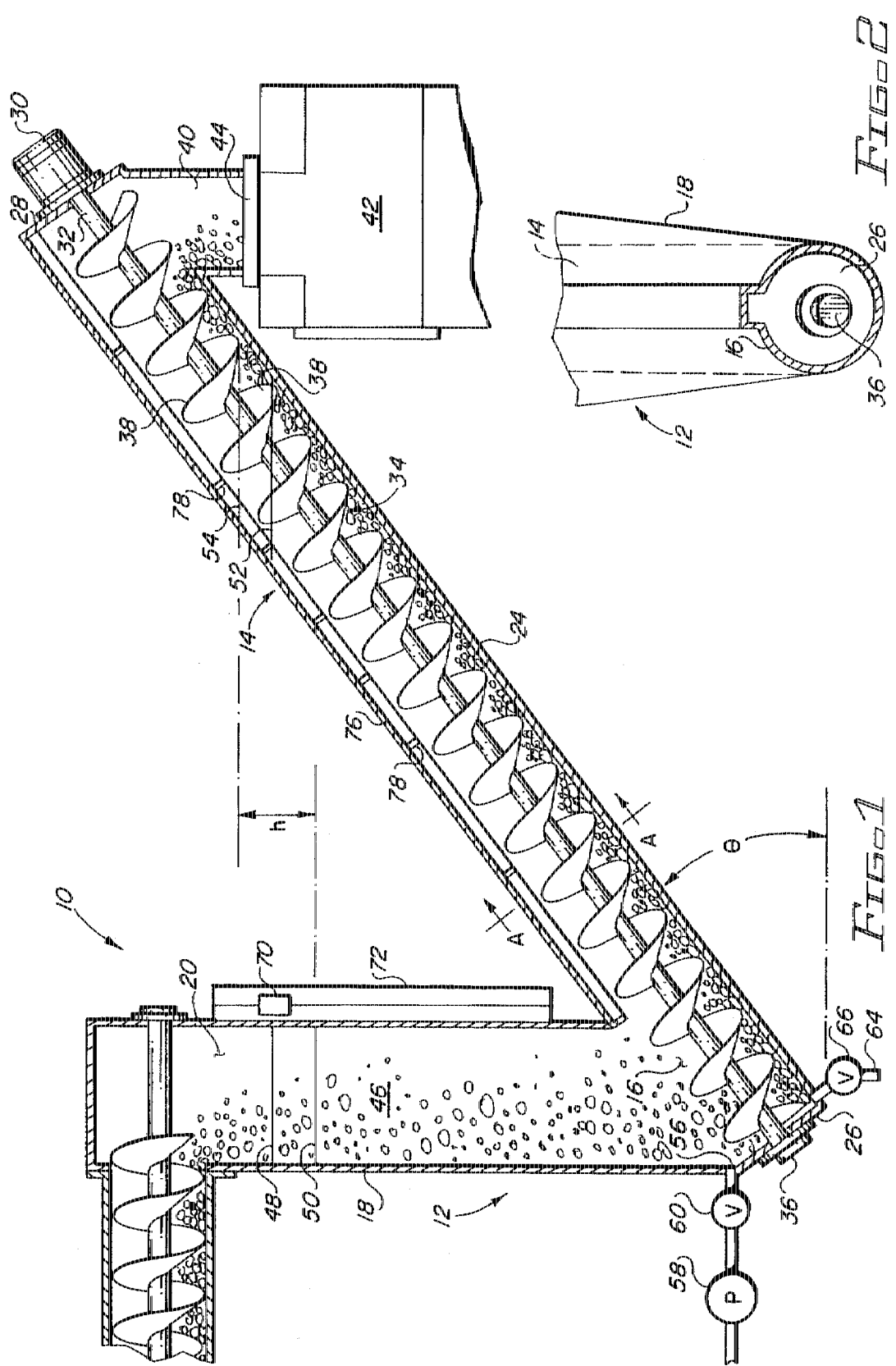

LIQUID SEAL BULK FEEDER FOR DESTRUCTIVE DISTILLATION

BACKGROUND OF THE INVENTION

1. Field of the Invention

The present invention relates to an apparatus for feeding a distillation unit. More particularly, the present invention relates to an apparatus for feeding bulk carbonaceous material, such as chips of used automobile tires, to a destructive distillation unit while sealing against exchange of ambient air and distillation gases through the feeding system.

2. Description of the Prior Art

One of the inherent problems in the art of destructive distillation of carbonaceous solids, such as bulk chips of automobile tires, is to accomplish effective feeding or charging of the distillation unit. The problem is compounded when one attempts to feed bulk solid materials to a continuously operating still while maintaining a seal between the atmosphere and the still such that flammable gases from the destructive distillation process do not mix with oxygen-containing gases, such as atmospheric air, which results in damaging explosions and fires in the still and feeding system. Various means have been utilized to solve this problem, such as the employment of inert gas generators to blanket carbonaceous material in storage and conveying equipment with an inert gas incapable of sustaining combustion. Other means include the use of double or triple drop boxes with flap gates, and the use of locks with rotary vane type valves designed to allow passage of solids while avoiding passage of air or distillation gases through the feed system. For example, Koch (U.S. Pat. No. 4,287,157) shows such a feed box and rotary lock in a coal reactor. However, all of the above-mentioned sealing devices suffer from excessive wear, clogging, mechanical failure, and incomplete sealing effectiveness.

The employment of liquid seals for feeding devices for reactors or treating devices is generally known. For example, Deutsch et al. (U.S. Pat. No. 4,326,556) discloses a liquid seal in the charging of bulk material to a shaft furnace. However, a liquid seal, or multiple liquid seals as in Deutsch et al., are subject to failure upon the event of a pressure surge from the reactor or still. Also, a steady flow of bulk material through a liquid seal is not assured, a requirement of a continuously operating destructive distillation unit.

The shortcomings of the above-mentioned prior art feeding devices are overcome by the liquid seal feeding system of the present invention, which provides both a liquid seal, effective under normal operating conditions, with a screw conveyor or spiral auger conveyor. The combination is effective to seal against the surge flow of distillation gases back through the feeding system. In addition, the present invention provides for a reliable, continuous flow of solid bulk material such as rubber tire chips to the distillation unit.

According to the present inventive bulk feeding system, a partially submerged inclined spiral auger conveyor is provided, communicating at its base with a liquid reservoir so as to form a liquid seal within the combined apparatus. Solid bulk material is introduced to the upper end of the liquid reservoir above the liquid level where it descends by the action of gravity into the liquid and sinks to the bottom of the reservoir to by picked up by the partially submerged rotating auger conveyor and elevated thereby. The bulk material is raised above the liquid level and introduced to the distillation unit inlet. The requirement of a small clearance between the flights of the auger and its cylindrical wall, along with the presence of the bulk material being conveyed within the auger, acts as a seal against distillation gas surges, thus avoiding fires and explosions in the bulk material storage and conveying apparatus.

SUMMARY OF THE INVENTION

Accordingly, it is an object of the present invention to provide a bulk material feeding system for continuously feeding a continuous operating reactor or destructive distillation unit.

A further object of the present invention is to provide a bulk material feeding system having a liquid seal capable of sealing ambient air from a reactor or distillation unit while maintaining a continuous flow of bulk material to the unit.

A still further object of the present invention is to provide a bulk material feeding system for continuously feeding a reactor or distillation unit which is capable of sealing against surges of gas from the unit traveling back through the feeding system to the bulk material storage and conveying area.

Another object of the present invention is to provide a bulk material feeding system comprised of a combined liquid seal and auger conveyor capable of delivering bulk carbonaceous material, such a rubber tire chips, to a decomposition/distillation unit while sealing against entry of ambient air into the unit and sealing against backflow of distillation gas surges through the feeding system.

Yet another object of the present invention is to provide a sealing auger conveyor having a small clearance between the rotating auger and its cylindrical wall to feed bulk material such as rubber tire chips to a distillation unit while sealing against the backflow of distillation gas surges through the auger conveyor.

Other objects, feature, and advantages of the present invention will become apparent more fully from the following description.

BRIEF DESCRIPTION OF THE DRAWING

The accompanying drawings, which are incorporated in and form a part of the specification, illustrate an embodiment of the present invention and, together with the description, serve to explain the principles of the invention.

FIG. 1 is a diagrammatic sectional view in elevation of the liquid seal feed bulk feed system of the present invention.

FIG. 2 is a detail view of the lower portion of the liquid seal feed system of FIG. 1.

DETAILED DESCRIPTION OF THE INVENTION

Figure 3:
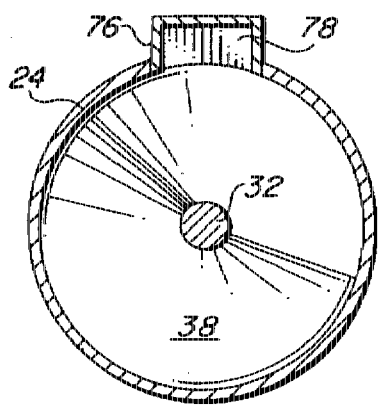
FIG. 3 is a cross sectional view along A—A of the auger and casing of FIG. 1 illustrating the material collection channel.

Referring to FIGS. 1, 2, 3, and 4, liquid seal feed system 10 includes fluid reservoir 12 and inclined feed auger conveyor 14 connected at its lower end with the lower end of fluid reservoir 12 at feed auger inlet 16. Fluid reservoir 12 includes reservoir wall 18 extending vertically from feed auger inlet 16 to reservoir inlet 20, reservoir wall 18 being so configured as to form a closure capable of containing a liquid therein. Feed screw conveyor 22 is connected with fluid reservoir 12 at reservoir inlet 20. Inclined feed auger conveyor 14 includes cylindrical auger casing 24, lower auger end cap 26, and upper auger end cap 28, and is disposed at an angle θ to the horizontal. Auger drive motor 30 is located at upper auger end cap 28 and drives auger drive shaft 32 of rotating auger 34 at a desired rotational speed. Auger drive shaft 32 extends along the central longitudinal axis of feed auger conveyor 14, as defined by cylindrical auger casing 24, and is supported for rotation at its lower end by drive shaft bearing 36 located on lower auger end cap 26. Rotating auger 34 features helical shaped spiral flight 38 located on auger drive shaft 32. Spiral flight 38 extends across the cross section of feed auger conveyor 14 so as to maintain a relatively small clearance of about 3 millimeters between its outer edge and the inner wall of cylindrical auger casing 24. More than one spiral flight may be mounted along auger drive shaft 32, if desired. Feed auger outlet 40 is located near the upper end of inclined feed auger conveyor 14 and is connected with the underside of cylindrical auger casing 24 and extends downward to distillation unit 42. Slam gate valve 44 separates feed auger outlet 40 and distillation unit 42.

Sealing liquid 46, such as oil, is located in reservoir 12 to operating reservoir liquid level 48. When operating under vacuum conditions in distillation unit 42, sealing liquid 46 assumes the vacuum reservoir liquid level 50, which is equal to reservoir liquid level 48. Sealing liquid 46 extends into inclined feed auger conveyor 14 to operating feed auger liquid level 52. When operating under vacuum conditions in distillation unit 42, sealing liquid 46 assumes the vacuum feed auger liquid level 54. The head of liquid in the liquid seal feed system is h, the difference in levels 50 and 54. Makeup fluid inlet 56 is located at the lower end of fluid reservoir 12. Makeup fluid pump 58 supplies makeup fluid from a suitable reservoir (not shown). Flow of liquid through makeup fluid inlet 56 from makeup fluid pump 58 is controlled by makeup liquid valve 60, which may be automatic or manually operated. Liquid drain 64 is located at the lower end of feed auger conveyor 14. Flow of liquid through liquid drain 64 is controlled by liquid drain valve 66, which may be automatic or manually operated. Float level control 70 operates within level control float housing 72, which is elongated in shape and located vertically along the length of reservoir wall 18 and in liquid communication with reservoir 12, and provides an indication of the liquid level in fluid reservoir 12.

In a preferred embodiment of the invention, a material removal channel 76, which is elongated in shape, is located extending along the upper side of that portion of cylindrical auger casing 24 containing spiral flight 38 and communicating with the interior thereof along its length, providing for the accumulation of small bits of rigid material such as steel wire. Baffles 78 are spaced along channel 76 and extend across the interior thereof so as to prevent flow of gases along the length of channel 76.

Figure 4:
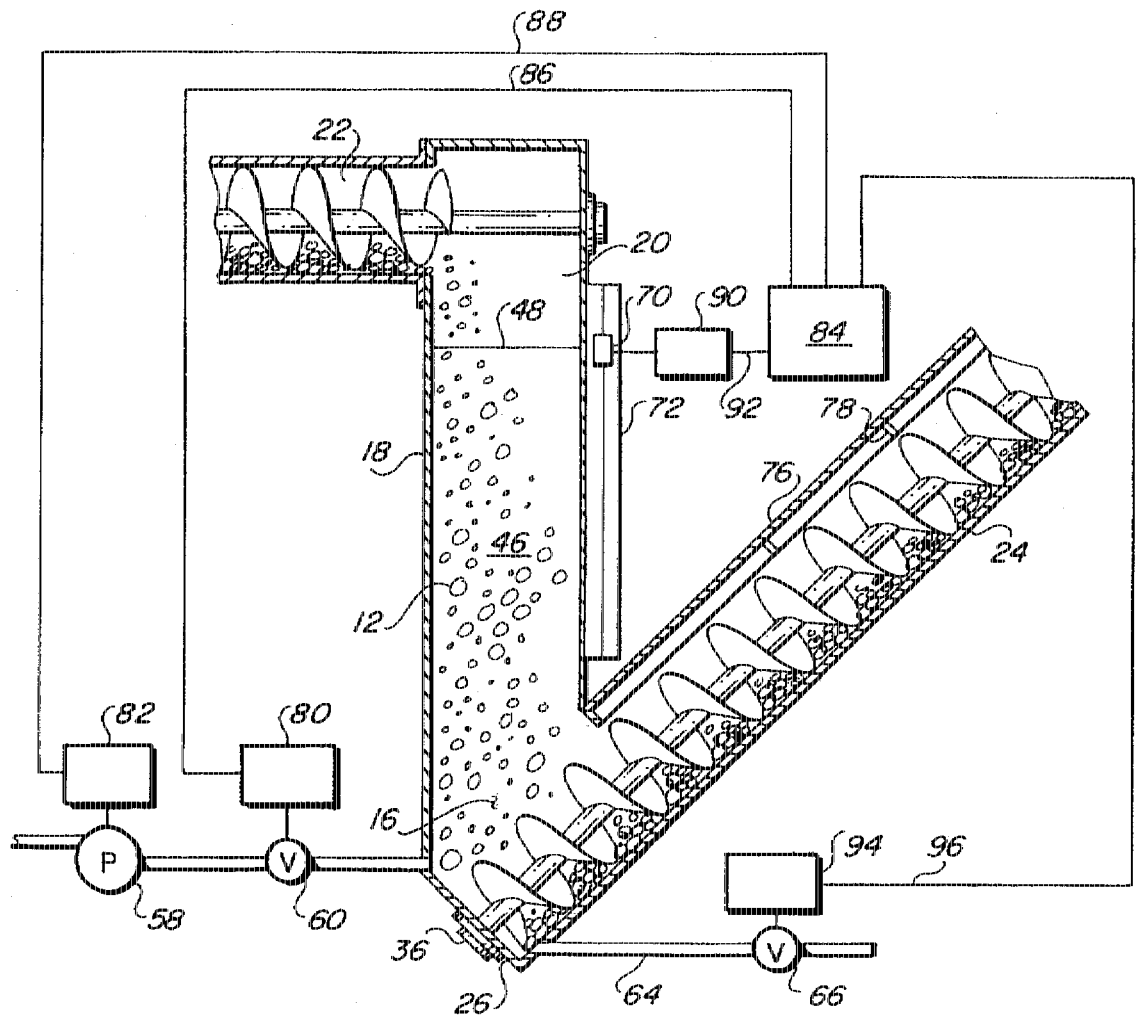
FIG. 4 is a detail view of a preferred embodiment of the present invention illustrating a liquid level automatic control system for the fluid reservoir of FIG. 1.

In a further preferred embodiment of the invention, as shown, particularly, in FIG. 4, makeup liquid valve 60 for fluid reservoir 12 is controlled by automatic valve controller 80. Makeup liquid pump 58 is controlled by automatic pump control 82. Automatic controller 84 is connected to valve controller 80 by valve control line 86. Automatic controller 84 is connected to pump control 82 by pump control line 88. Level control float 70 is connected to float control sensor 90. Automatic controller 84 is connected to float control sensor 90 by float control line 92. Liquid drain valve 66 is located in liquid drain 64 and controlled by drain valve control 94. Automatic controller 84 is connected to drain valve control 94 by drain valve control line 96. The above-described control apparatus may be pneumatic or electric, as well known in the art.

In operation, bulk solid carbonaceous material, such as chips of used automobile tires, enter liquid seal feed system 10 through feed screw conveyor 22, which may be a spiral auger conveyor or other known bulk solids conveyor. The carbonaceous material is thereby fed to fluid reservoir 12 through reservoir inlet 20 where it falls to reservoir liquid level 48 and proceeds to sink to the bottom of fluid reservoir 12. The bulk material is then engaged by rotating auger 34, driven by auger motor 30, at feed auger inlet 16. The solids feed material is then elevated along feed auger conveyor 14 by means of the action of spiral flight 38 past auger liquid level 52 to feed auger outlet 40, where it enters distillation unit 42 for processing. Slam gate valve 44 is operable to cut off fluid communication between feed auger conveyor 14 and distillation unit 42 when desired. When operating with tire chips, the preferred liquid 46 is oil, and it may be used motor oil. The liquid 46 acts as a seal to prevent ambient air from entering distillation unit 42 from feed screw conveyor 22.

Distillation unit 42 will normally be operating at atmospheric pressure or below. When operating at atmospheric pressure, liquid 46 assumes reservoir liquid level 48 and auger liquid level 52. Any differential in operating pressure between the distillation chamber 42 and atmospheric or other condition in the feed screw conveyor 22 is compensated for by head h, the differential in liquid levels 50 and 54. The vacuum feed auger liquid level 50 will automatically assume a height h, below vacuum reservoir liquid level 54 such that the weight of the oil or other liquid will compensate for the pressure differential between the distillation unit 42 and ambient air pressure.

As tire chips are transported through feed system 10, the oil which comprises liquid 46 is slowly depleted as it wets the tire chips and is carried therewith to distillation unit 42. The presence of this oil is beneficial to the operation of the distillation unit 42 in many instances. Makeup oil may be introduced to fluid reservoir 12 by means of the operation of makeup liquid pump 58 through makeup liquid inlet 56 controlled by makeup liquid valve 60 to maintain operating reservoir liquid level 48. A desired liquid level can be maintained by manipulating valve 60 while observing level control float 70 in float housing 72.

The small clearance between spiral flight 38 of rotating auger 34 with the inner wall of cylindrical auger casing 24, preferably about 3 millimeters, along with the presence of solids materials between the flightings of spiral flight 38 is effective to prevent sudden backflow of gases from distillation unit 42 through liquid seal feed system 10 to the atmosphere, thus preventing fire and explosion hazards. The maintenance of liquid 46 such as oil to adequate levels such as reservoir operating liquid level 48 and feed auger operating liquid level 52 prevents the entrance of ambient air to distillation unit 42 and expulsion of distillation gases from distillation unit 42 to any ambient air present in feed screw conveyor 22, thus preventing explosion hazards.

The angle θ of incline of feed auger 14 to the horizontal may be any desired angle within the range of 20 to 60 degrees but is preferably about 35 degrees. Although fluid reservoir 12 is normally vertically disposed, it could be configured to operate at an incline if desired.

In the operation of a preferred embodiment, a material removal channel 76 is located extending along the upper side of cylindrical auger casing 24 and communicates with the interior thereof to provide for the accumulation of small bits of rigid material such as steel wire from bulk automobile steel belted tire chips which may lodge between spiral flights 38 and cylindrical auger casing 24, causing difficulties in auger operation. These bits of steel wire or other materials accumulate in material removal channel 76 and then mix with the bulk of material being conveyed in feed auger conveyor 14. Baffles 78 prevent flow of gases and ambient air through channel 76.

In the operation of the preferred embodiment of the present invention illustrated in FIG. 4, level control float 70 is free to rise and fall within float housing 72 with the reservoir liquid level. When level control float 70 falls below the desired operating level, float control sensor 90 sends a signal to automatic controller 84 by means of float control line 92. Controller 84 then sends a first signal to pump controller 82 by means of pump control line 88, actuating pump 58 to begin pumping makeup liquid from a liquid supply (not shown), and a second signal to valve controller 80 by means of valve control line 86 actuating makeup liquid valve 60 to an open position, thus providing for flow of makeup liquid through makeup liquid inlet 56 to fluid reservoir 12. As liquid enters reservoir 12, level control float 70 rises to the desired operating liquid level in reservoir 12, at which point float control sensor 90 sends a signal to automatic controller 84 by means of float control line 92. Controller 84 then sends a third signal to pump control 82 by means of pump control line 88 to deactivate pump 58, and a fourth signal to makeup liquid valve control 80 by means of valve control line 86 to activate control valve 60 to turn to a closed position, thus halting flow of makeup liquid to fluid reservoir 12.

When level control float 70 rises above its desired operating level, float control sensor 90 sends a signal to automatic controller 84 which, in turn, sends a signal to drain valve control 94 by means of drain valve control line 96 to actuate drain valve 66 to turn to an open position. As liquid drains through liquid drain 64, level control float 70 lowers to the desired operating level at which point float control sensor 90 sends a signal to automatic controller 84 which, in turn, sends a signal to drain valve control 94 to actuate drain valve 66 to turn to a close position, thus, halting flow of liquid from fluid reservoir 12. The liquid level in fluid reservoir 12 may be controlled by the above control system to maintain liquid level 48, vacuum liquid level 50, or any other desired operating level.

The present invention is further illustrated by the following:

EXAMPLE

A feeder system according to the present invention was operated at a throughput of 3,350 lb/hr. For this throughput, the inventive liquid seal combination reservoir/conveyor employed a vertically disposed fluid reservoir having a cross section of about 324 square inches and an operating depth of about 5 feet. A spiral auger of 18 inches in diameter and 20 feet in length with a flight pitch of nine inches and set at an angle of 35 degrees to the horizontal was employed. The liquid level was maintained with oil at a level of 3 feet of vertical head within the combined reservoir/conveyor at zero pressure differential. When operating with a vacuum of 3 in. water in the receiving distillation unit, the liquid level in the reservoir was about 3½ inches below the liquid level in the auger. The liquid level in the reservoir was allowed to fall to compensate for the elevated liquid level in the auger. An alternative mode of operation provides for the liquid level in the reservoir to be maintained and the elevated level in the auger obtained by adding additional liquid to the reservoir.

Although the feeding equipment discussed above are described in connection with the feeding of carbonaceous material to a decomposition or destructive distillation apparatus, the inventive liquid seal feeder may be beneficially employed in any system where it is desired to feed bulk solids material to a reactor or the like while avoiding the flow of ambient air or other gases therethrough. The equipment described in the above examples may be constructed according to standard engineering practice from materials standard in the field of destructive distillation systems.

The particular sizes and equipment discussed above are cited merely to illustrate a particular embodiment of this invention. It is contemplated that the use of the invention may involve components having different sizes and shapes as long as the principles are followed, namely, the provision of a feeding system for a reactor or destructive distillation unit having a combination fluid reservoir and small clearance spiral auger conveyor forming both a liquid seal and a seal effective against backflow of gas surges. It is intended that the scope of the invention be defined by the claims appended hereto.

We claim:

1. A combination liquid seal reservoir/feed auger conveyor apparatus for continuously feeding material, such as chips of used automobile tires, to a reactor or distillation unit while maintaining a seal against the exchange of distillation gases and atmospheric air comprising:

A. A liquid reservoir having an inlet at an upper end thereof, and an outlet at a lower end thereof; and B. An inclined feed auger conveyor having an inlet at a lower end thereof and an outlet at an upper end thereof;

C. Said liquid reservoir being connected at its lower end and in liquid communication with said lower end of said feed auger conveyor;

D. Said liquid reservoir and said feed auger conveyor being partially filled with a liquid to an operating reservoir liquid level and an operating feed auger liquid level, respectively;

E. Said feed auger conveyor having a cylindrical auger casing and a rotatable spiral auger located therein and an elongated channel located along the upper side of said inclined cylindrical auger casing in communication with the interior of said inclined feed auger, whereby bits of debris such as steel wire trapped between said spiral flights of the rotating auger and said cylindrical auger casing become lodged in said channel and then drop into the mass of said bulk material being conveyed in said inclined auger;

F. Said cylindrical casing and said rotatable spiral auger having a clearance therebetween of such small dimension as to substantially prevent the flow of gases or ambient air therebetween;

whereby said bulk solid material entering said reservoir inlet drops by gravity into said liquid and sinks within said reservoir to said feed auger conveyor inlet and is engaged and transported by action of the rotation of said rotatable spiral auger within said cylindrical auger casing of said feed auger conveyor to a point above said operating auger liquid level and is discharged through said feed auger outlet for delivery to said reactor or distillation unit, and wherein said liquid is an oil such as recycled condensate from said reactor or distillation unit.

2. The liquid seal feed apparatus of claim 1 wherein said rotatable spiral auger comprises an auger drive shaft, a spiral flight located on said auger drive shaft, and an auger drive shaft motor for rotating said rotatable spiral auger and located at said upper end of said inclined feed auger.

3. The liquid seal feed apparatus of claim 2 wherein said cylindrical auger casing and said spiral flight has a small clearance of about 3 millimeters, whereby said cylindrical auger casing and said rotatable spiral auger act as a seal against the flow therethrough of gas surges from said reactor or distillation unit.

4. The liquid seal feed apparatus of claim 1 further comprising a feed conveyor connected with said fluid reservoir at said reservoir inlet for introducing bulk solid material into said fluid reservoir.

5. The liquid seal feed apparatus of claim 1 wherein the angle of incline of said feed auger conveyor with the horizontal is from about 20 degrees to about 60 degrees.

6. The liquid seal feed apparatus of claim 5 wherein said angle of incline is about 35 degrees.

7. The liquid seal feed apparatus of claim 1 wherein said fluid reservoir has at least one vertical wall.

8. The liquid seal feed apparatus of claim 7 further comprising a makeup liquid inlet located on said vertical wall of said fluid reservoir in the vicinity of said feed auger inlet, a makeup liquid pump for introducing makeup liquid to said inlet, and a makeup liquid valve for controlling the introduction of makeup liquid from said pump to said fluid reservoir through said makeup liquid inlet.

9. The liquid seal feed apparatus of claim 8 further comprising a level control float located in a float housing, said float housing being elongated in shape and located vertically along said vertical wall and in liquid communication with said fluid reservoir, said level control float being free to rise and fall with the liquid level in said reservoir, said level control float and said float housing being operable to indicate the level of liquid in said fluid reservoir.

10. The liquid seal feed apparatus of claim 9 further comprising automatic control means connected with said level control float and said makeup liquid valve and said makeup liquid pump, said control means being activated upon the dropping of said level control float below said operating reservoir liquid level and operable upon said activation to activate said makeup liquid pump and said makeup liquid valve to provide liquid through said makeup liquid inlet to said fluid reservoir and to deactivate said pump and said valve upon the liquid in said fluid reservoir reaching said operating reservoir liquid level.

11. The liquid seal feed apparatus of claim 1 further comprising a liquid drain located on said cylindrical auger casing in the vicinity of said feed auger inlet, and a liquid drain valve connected with said liquid drain.

12. The liquid seal feed apparatus of claim 1 further comprising a plurality of baffles spaced along and extending across said channel, whereby any flow of gases through said channel is impeded.

13. The liquid seal feed apparatus of claim 1 further comprising a slam valve located at said feed auger outlet operable to isolate said inclined feed auger from said reactor or distillation unit when desired.

* * * * *